United States Patent [19]
Bayha et al.

[11] Patent Number: 6,092,093
[45] Date of Patent: Jul. 18, 2000

[54] MULTIPLEXER DEVICE FOR FREQUENCY BANDS

[75] Inventors: Erwin Bayha, Schwaikheim; Heinz Goeckler, Backnang, both of Germany

[73] Assignee: Robert Bosch GmbH, Stuttgart, Germany

[21] Appl. No.: 08/809,153

[22] PCT Filed: Sep. 27, 1995

[86] PCT No.: PCT/DE95/01333

§ 371 Date: Feb. 25, 1997

§ 102(e) Date: Feb. 25, 1997

[87] PCT Pub. No.: WO96/12345

PCT Pub. Date: Apr. 25, 1996

[30] Foreign Application Priority Data

Oct. 18, 1994 [DE] Germany .............................. 44 37 158

[51] Int. Cl.[7] .................................................. G06F 17/10
[52] U.S. Cl. ........................................ 708/319; 370/210
[58] Field of Search .................................... 370/203, 208, 370/210, 481, 484, 488; 375/229, 230; 364/724.012, 724.13, 724.16; 708/300–323, 316

[56] References Cited

U.S. PATENT DOCUMENTS 5,587,939  12/1996  Soleymani et al. ...................... 708/319

FOREIGN PATENT DOCUMENTS

4116495C1  6/1992  Germany .

Primary Examiner—Chi H. Pham
Assistant Examiner—Maiknanh Tran
Attorney, Agent, or Firm—Michael J. Striker

[57] ABSTRACT

The frequency multiplexer device for combining n single signals of bandwidth (B), sampled with a sampling frequency (fa/n), includes a device for performing a Fourier transformation (FFT) of the single signals to obtain complex input signals having imaginary portions and real portions and a number of circuit devices for generating an output signal for multiplexing from the imaginary portion and the real portion of each complex input signal. Each output signal generating device includes respective different chains (111) of serially connected delay elements (110, D) for delaying the real and imaginary portions to form differently delayed imaginary real and signal portions; circuit devices for combining (+) and weighting pairs of the differently delayed real and imaginary signal portions to be weighted with respective weighting factors ($\gamma h(5)$, $-\gamma h(1)$, $\gamma h(3)$) to form respective weighted combined signals for each different weighting factor. Each device for combining and weighting includes a series circuit branch with an adder (112) and a single multiplier (113) connected to the adder and arranged to receive an addition result from the adder. The signal generating device also includes an additional device (114) for combining resultant signals from the multipliers to obtain the output signal.

4 Claims, 8 Drawing Sheets

MULTIPLEXER DEVICE FOR FREQUENCY BANDS

BACKGROUND OF THE INVENTION

1. Field of the Invention

The present invention relates to a frequency multiplexer for combining n single signals of bandwidth (B), sampled with a sampling frequency (fa/n), which are subjected to a Fourier transform to obtain complex input signals, which are each weighted and fed to a chain of delay and addition elements. It also relates to a frequency demultiplexer for frequency separation of a frequency multiplexer signal, composed of n single signals of bandwidth (B) sampled at the sampling frequency (fa) based on this type of frequency multiplexer structure.

Such demultiplexer/multiplexers are known, for instance from German Patent DE 41 16 495 C1. Such frequency demultiplexer/multiplexers find manifold uses, for instance in satellite communications technology. There it is especially urgently necessary that the volume, weight and power consumption be kept low.

SUMMARY OF THE INVENTION

For the present invention as well, it is therefore an object to provide a frequency demultiplexer/multiplexer of the type referred to at the outset that while fully performing the requisite operating functions makes do with the least possible expense, for instance with minimal chip area and/or the lowest possible power consumption.

According to the invention the frequency multiplexer device for combining a plurality (n) of single signals of bandwidth (B), sampled with a sampling frequency (fa/n), includes means for performing a Fourier transformation of the single signals to obtain complex input signals each having an imaginary portion and a real portion and a plurality of devices for generating an output signal for multiplexing from the imaginary portion and the real portion of each complex input signal. Each device for generating the output signal includes respective different chains of serially connected delay elements for delaying the real and imaginary portion to form differently delayed real and imaginary signal portions and means for combining and weighting pairs of differently delayed real and imaginary signal portions to be weighted with an identical one of a number of different weighting factors to form respective weighted combined signals for each different weighting factor, each of the means for combining and weighting comprising a series circuit branch including an adder and a single multiplier connected to the adder arranged to receive an addition result from the adder, the single multiplier comprising means for weighting the addition result of the adder with one of the weighting factors; and means for combining resultant signals from the multipliers to obtain the output signal.

In various preferred embodiments of the invention the frequency multiplexer also includes means for quantization of imaginary and real portions of the complex input signals, means for generating a correction signal for mean quantization errors and means for feeding the correction signal into one of the series circuit branches between its adder and single multiplier.

Furthermore features of the invention and preferred embodiments are described in the appended detailed description and claimed in the appended claims.

The frequency demultiplexer/multiplexer according to the invention has the advantages that at minimal expense for chip area and also with minimal power consumption, it is capable of meeting all the required operating functions. These advantages gain still further significance for a demultiplexer of HMM structure with many identical HMM cells, where it is possible to economize on a few multipliers or status memories in each cell and the structure of the status memories is also modified such that they consume less energy. Further advantages arise because some identical component groups are utilized multiple times in time-division multiplexing. Moreover, by restructuring addition and multiplication arrays into more-simple multiplication and addition trees, the possibility is gained that the typical word width shortening by quantizing downstream of multiplication stages, with the attendant quantizing errors, can be compensated for more efficiently and at less expense, which in turn leads to additional savings of chip area and chip power.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 7:
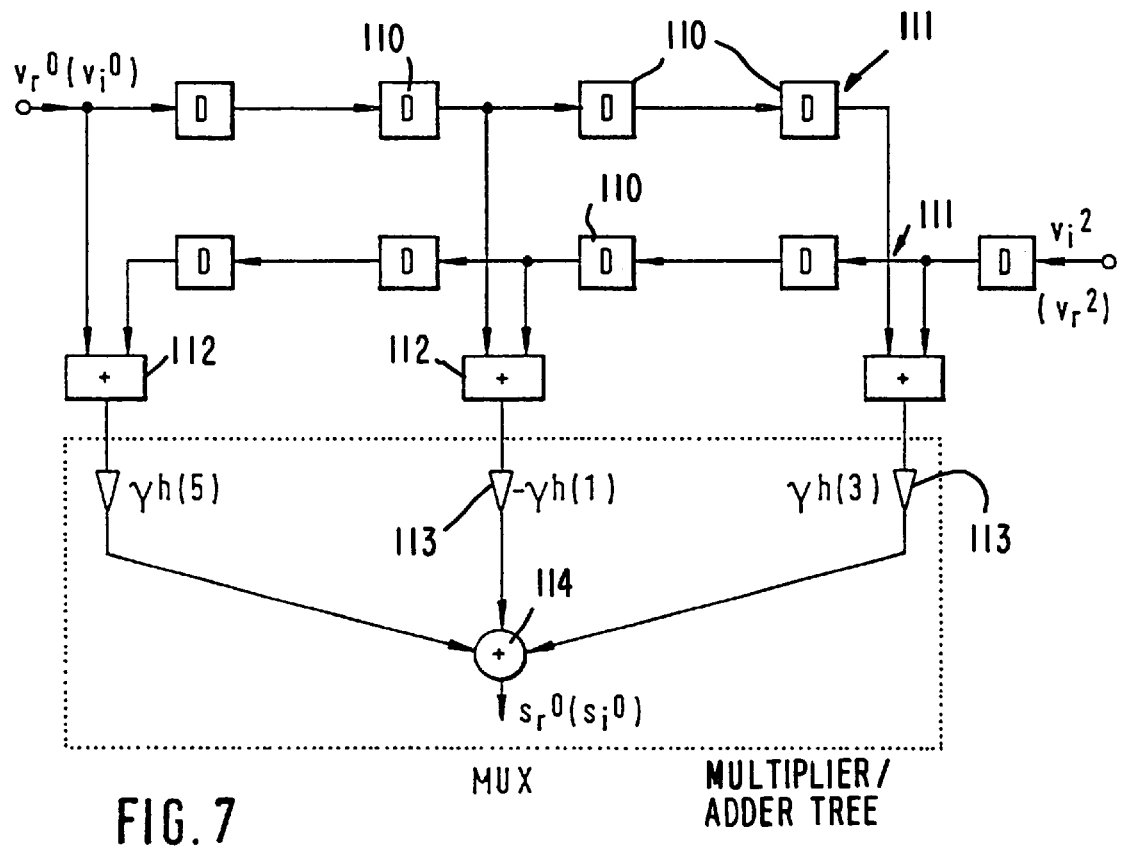
FIG. 7 is a block diagram of detailed structure of components B1 and B2 according to the invention to be used in the multiplexer of FIG. 3.
Figure 9:
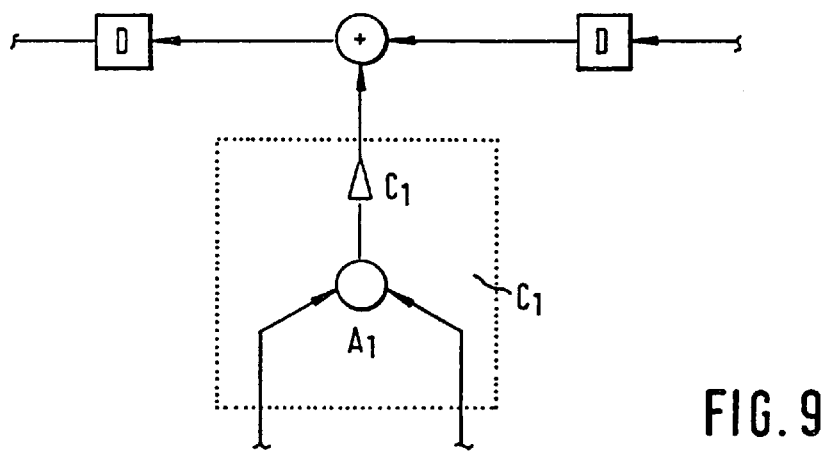
FIG. 9 is a block diagram of an alternative embodiment for a portion of the device shown in FIG. 8 in a dotted block labeled $c_1$.
Figure 8:
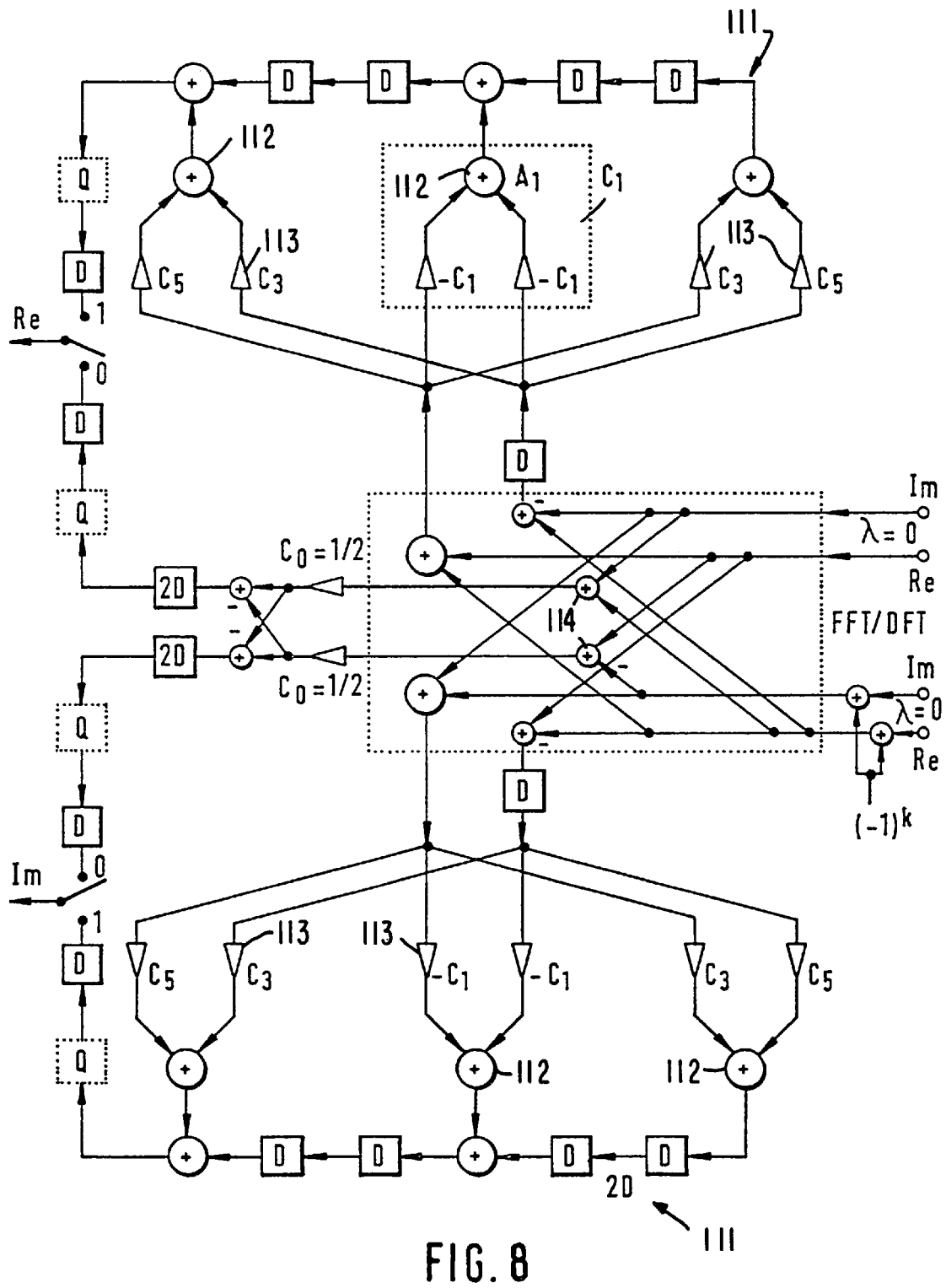
FIG. 8 is a block diagram showing additional detailed features of alternative embodiments for the components B1 and B2 according to the invention.

For the arrangement of the component groups B1 and B2 for the frequency multiplexer application (FIG. 5), the arrangements according to the invention as shown in FIGS. 7, 8 and 9 are now available, which require considerably less expense for multipliers or delay elements.

Figure 1:
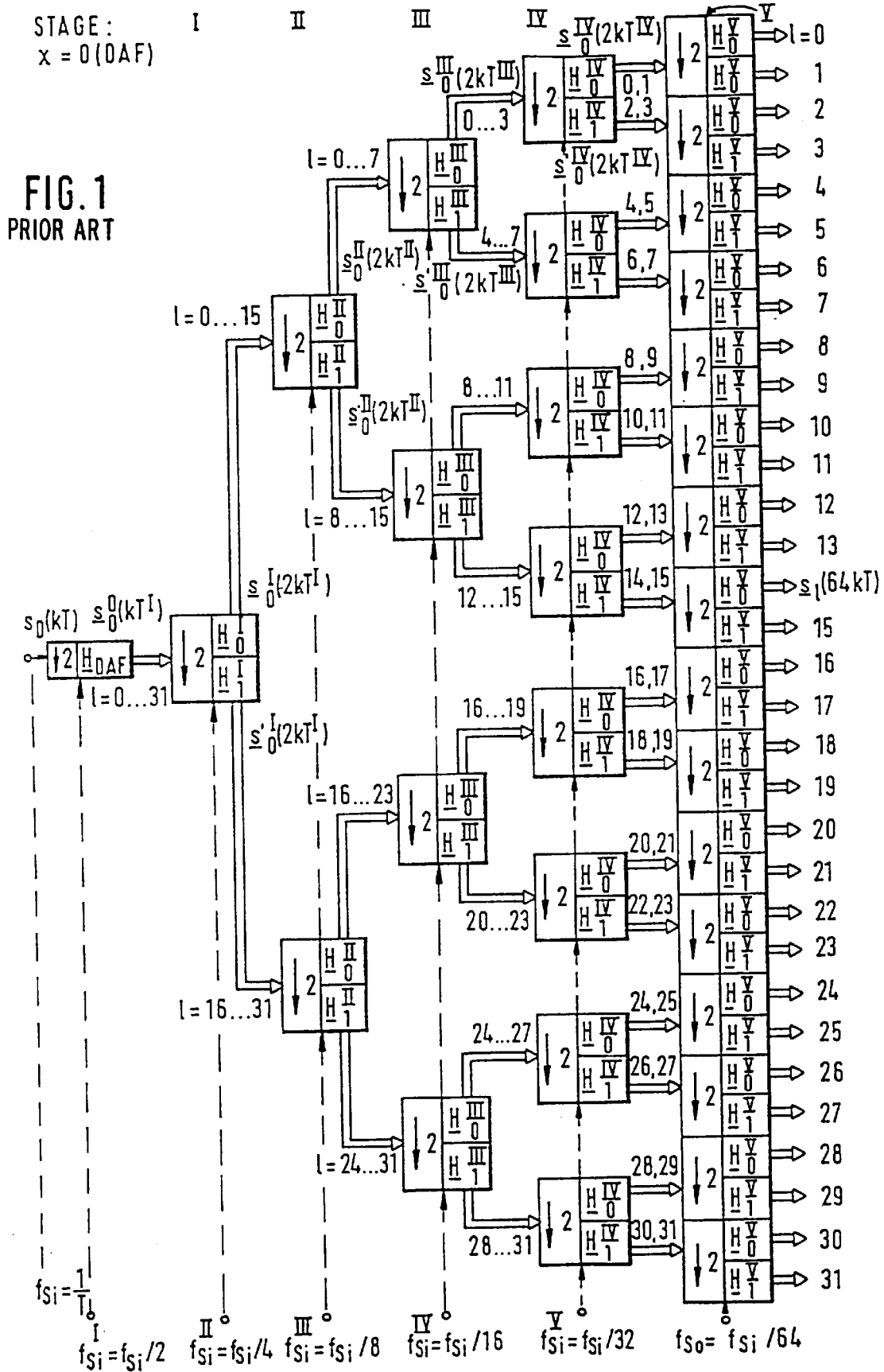
FIG. 1 is a block diagram of a prior art many-channel HMM multiplexer with many HMM cells, approximately of the form shown on FIG. 2.
Figure 2:
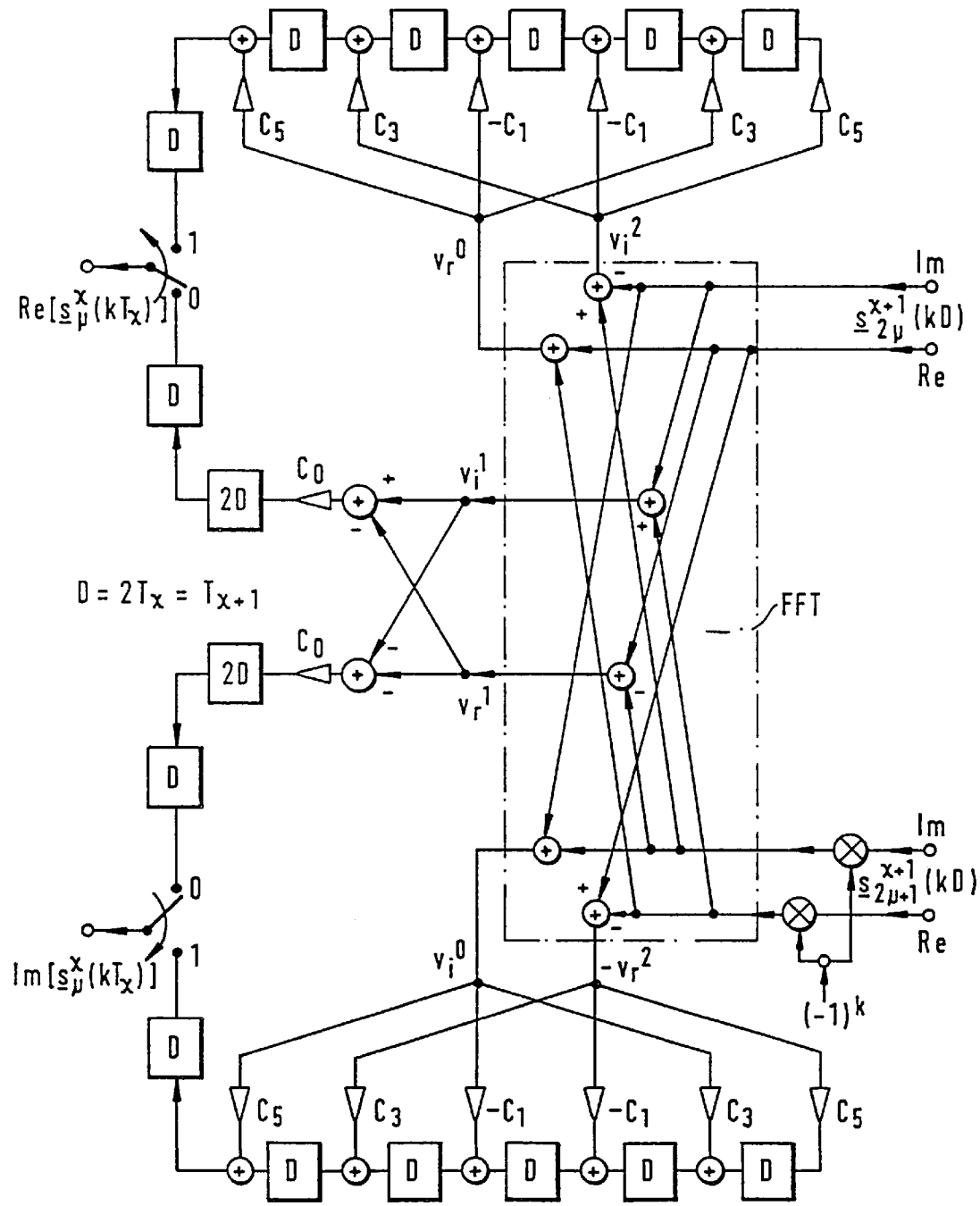
FIG. 2 is a block diagram of an HMM cell multiplexer of the prior art, which can be used in the device shown in FIG. 1 after being transposed.
Figure 2A:
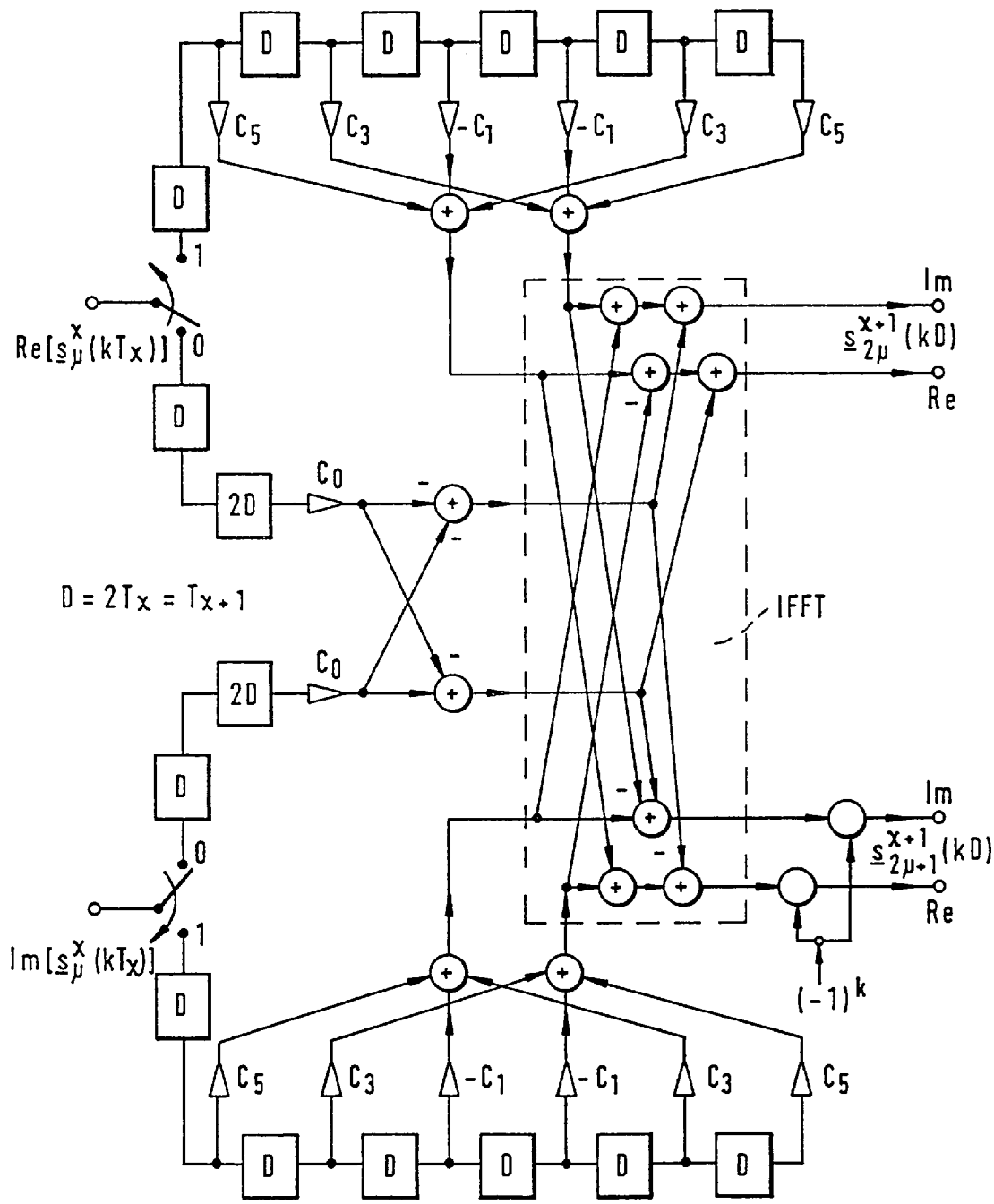
FIG. 2a is a block diagram showing the HMM cell multiplexer of FIG. 2 after being transposed so that it can be used in the device of FIG. 1.
Figure 3:
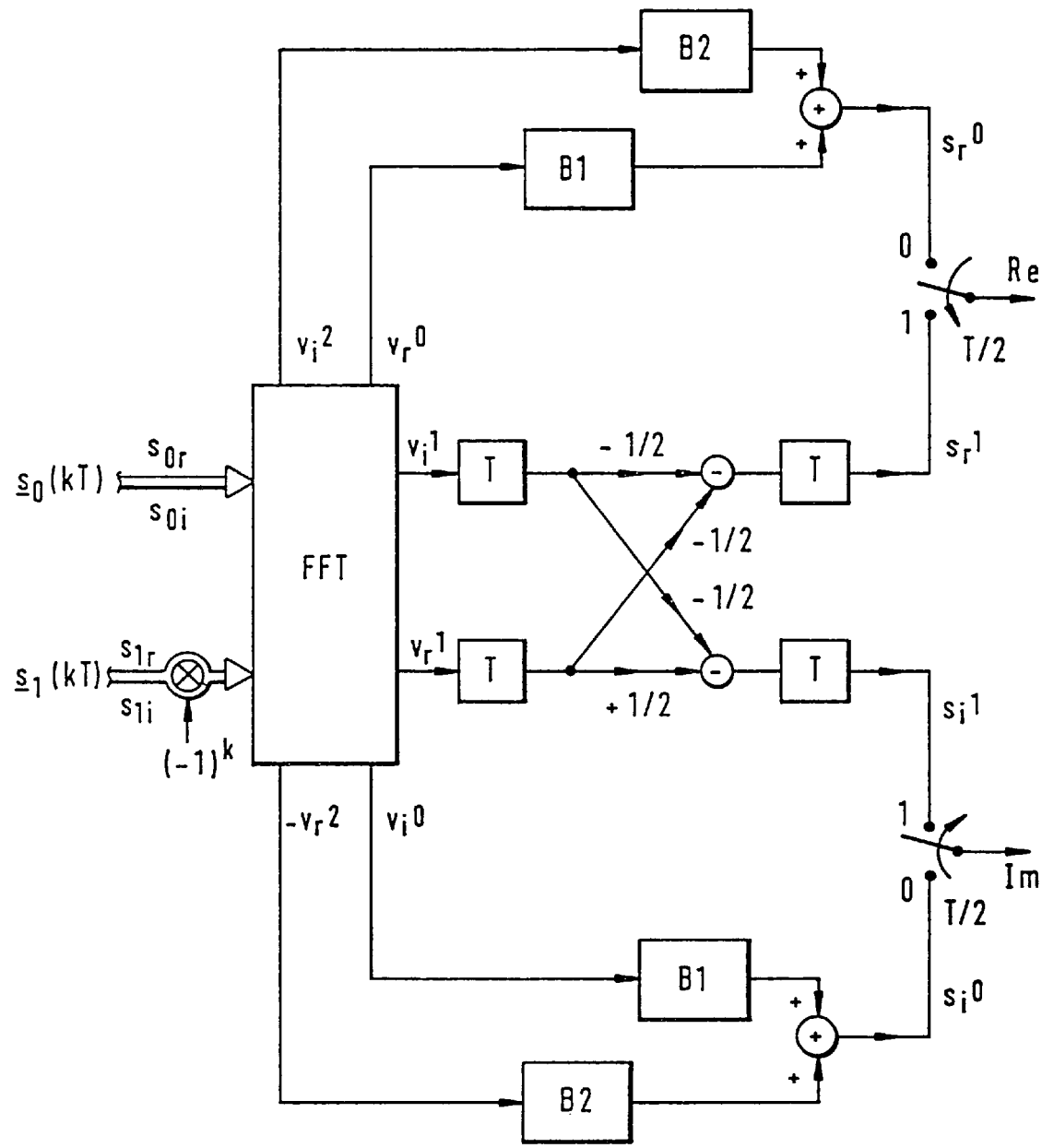
FIG. 3 is a block diagram showing the basic structure of a frequency multiplexer, either according to the invention or the prior art according to the detailed structure of components B1 and B2.
Figure 4:
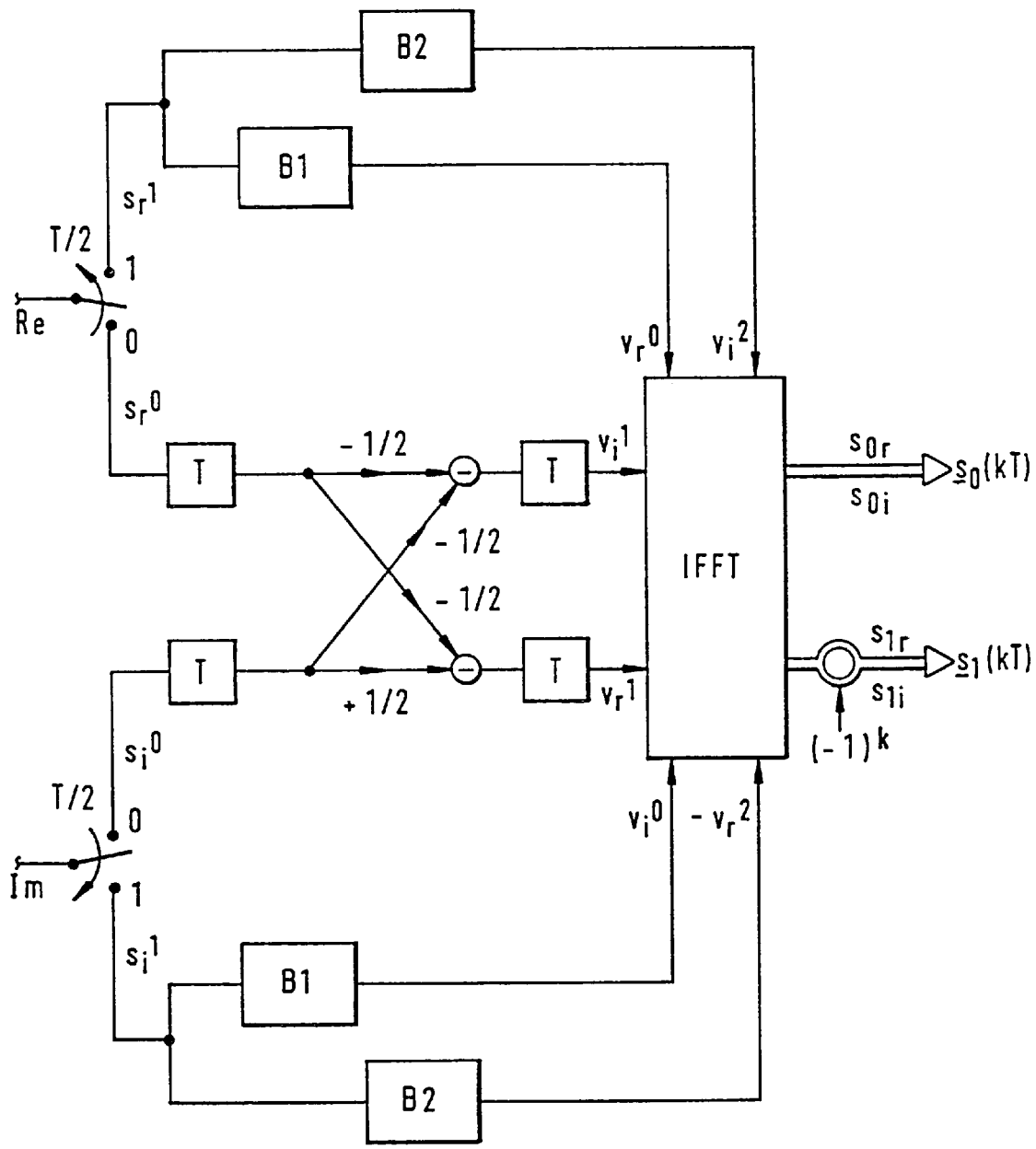
FIG. 4 is a block diagram showing the basic structure of a frequency demultiplexer corresponding to the frequency multiplexer of FIG. 3, either according to the invention or the prior art according to the detailed structure of components B1 and B2.
Figure 5:
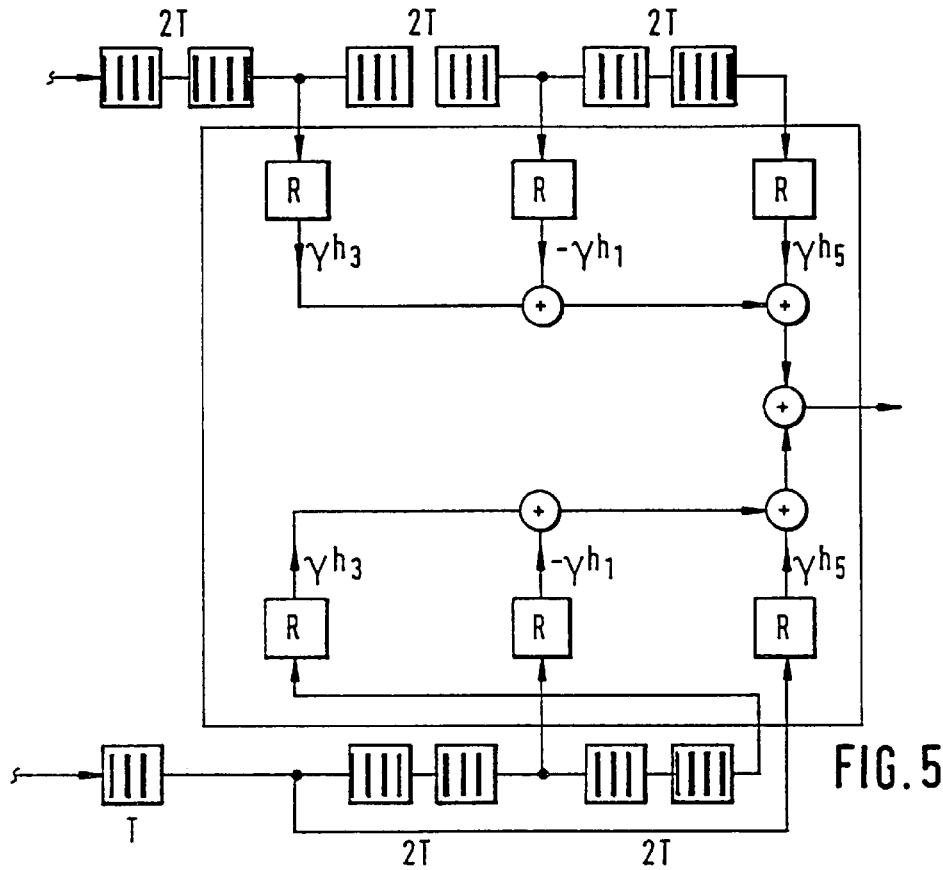
FIG. 5 is a block diagram showing detailed prior art structure of components B1 and B2 for the frequency multiplexer shown in FIG. 3.
Figure 6:
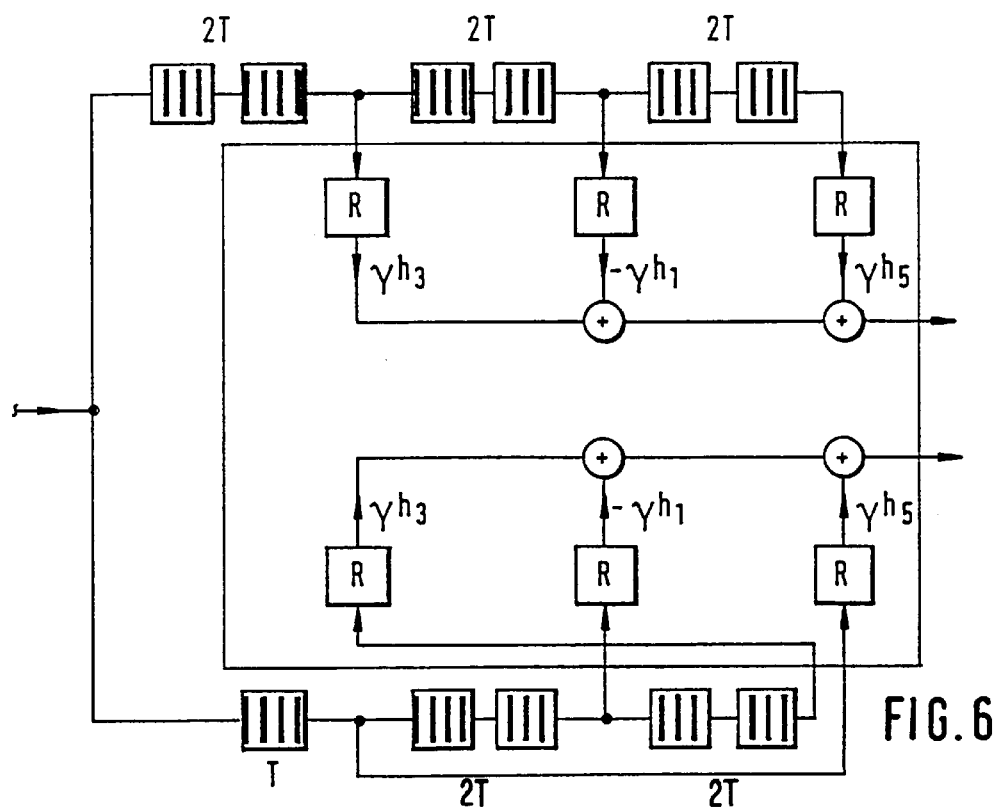
FIG. 6 is a block diagram showing detailed prior art structure of components B1 and B2 for the frequency demultiplexer shown in FIG. 4.

The component groups B1 and B2 of FIGS. 3 and 4, respectively, have a structure that comprises a chain of addition and delay elements and a series of coefficient multipliers; see FIG. 2, bottom and at the very top or FIG. 5 or 6. In FIG. 7, one can see the procedure according to the invention for the arrangement of blocks B1 and B2 of FIG. 5 (FMUX), namely a chaining together of the two component groups B1 and B2, but not in the form of FIG. 2 at the bottom or very top but rather in such a form that the two complex input signals $vr^0$ and $vi^2$ or $vi^0$ and $vr^2$ are first introduced into purely delay-type chains 111 at delay elements D, 110, then in accordance with the filtering prescription are combined by means of respective adders 112, + so that then they can be weighted by means of three coefficient multipliers 113; $\gamma h(5)$, $-\gamma h(1)$, $\gamma H(3)$. The outputs of these three coefficient multipliers are then combined by means of the last addition element 114 into the partial output signal $sr^0$ or $si^0$, and are then taken for output multiplexing.

The savings is 50% per multiplier per B1/B2 array. Moreover, this creates a multiplier/adder tree, which enables simple compensation for quantization errors. Further detail on this can be found in FIG. 8.

A further advantage is that the status memory is concentrated in larger units, and thus the shift registers, which have high power consumption for every shift operation, can be replaced with FIFO memories or RAM memories, which can be triggered more efficiently for writing in or reading out, for instance being triggered via pointer or address calculation, and which operate at lower power. Still another advantage is that the requisite word width of the status memories is identical and is greater by at most one bit (because of the preceding FFT) than the input signal word length of the frequency multiplexer filter cell. In the chain of addition and delay elements of FIG. 2, the word width of the delay elements D conversely, unless other provisions for word width shortening are taken, is equal to the sum of the coefficient C word width and the input signal word width, or in other words approximately twice the input word width, unless quantization is performed after each of the coefficient multiplications (word width reduction to one filter-internal word width, which nevertheless is always greater than the input signal word width), but this always means a certain additional expense (above all if correction signals are added, for instance in order to minimize direct components).

Although the multiplexer filter structure of FIG. 8 has the same number of multipliers as those of FIG. 2 or 5, nevertheless here small multiplexer/adder trees have been created, which permit less-expensive embodiments, especially if the coefficients are embodied in CSD code (CSD code stands for canonic signed digit code). The number of status memories is minimal, or in other words canonic, however; namely there are only two delay elements with twice the clock delay time 2D and one delay element with the unit clock delay time D at the output of the FFT/DFT block. Especially with large frequency multiplexer trees, this leads to corresponding advantages in terms of expense. Moreover, the status memories are concentrated in the larger unit, so that the advantages described earlier herein can be attained here as well. Because the six multipliers are distributed among three multiplier/adder trees, quantization (optionally including the addition of correction variables) can be done at the output of each of these trees with less expense than in FIG. 2, which again leads to the corresponding, optionally different shortening of the word width in the status memories. However, if the word width of these status memories is unimportant, then the quantization can be done later, not until the output branch, which correspondingly minimizes the expense for the quantization. Finally, the possibility exists of reducing the word width appropriately in each multiplier/adder tree (for instance by means of the minimally expensive chopping operation) and of adding the correction variable or variables for all the M/A trees once and for all at the output of the chain.

One more multiplier can be dispensed with in accordance with FIG. 9, if the addition takes place in the middle branches of FIG. 8 before the multiplication by −c1.

A double utilization of the component groups B1+B2 in the time-division multiplexing, both by the complex output signals $vi^0$, $vr^2$ and $vr^0$, $vi^2$ of the fast Fourier transform FFT with only one set B1, B2 enables further reduction of expense. The use in a many-channel HMM frequency demultiplexer/multiplexer here again multiplies the savings.

What is claimed is:

1. A frequency multiplexer device for combining a plurality (n) of single signals of bandwidth (B), sampled with a sampling frequency (fa/n), said frequency multiplexer device comprising means for performing a Fourier transformation (FFT) of said single signals of said bandwidth (B) to obtain a plurality of complex input signals, each of said complex input signals having an imaginary portion and a real portion; and a plurality of means for generating an output signal for multiplexing from the imaginary portion and the real portion of each of said complex input signal;

wherein each of said means for generating said output signal includes respective different chains (111) of serially connected delay elements (D,110) for delaying said real portion and said imaginary portion to form differently delayed imaginary signal portions and differently delayed real signal portions;

means for combining (+) and weighting pairs of said differently delayed imaginary signal portions and said differently delayed real signal portions to be weighted with an identical one of a plurality of different weighting factors ($\gamma h(5)$, $-\gamma h(1)$, $\gamma h(3)$) to form respective weighted combined signals for each of said different weighting factors, each of said means for combining and weighting comprising a series circuit branch including an adder (112) and a single multiplier (113) connected to said adder arranged to receive an addition result from said adder, said single multiplier (113) comprising means for weighting said addition result of said adder with said one of said weighting factors;

means for quantization of said imaginary and real portions of said complex input signals;

means for generating a correction signal for mean quantization errors;

means for feeding said correction signal into one of said series circuit branches between said adder and said single multiplier in said series circuit branch; and means (114) for combining resultant signals from said multipliers to obtain said output signal of said means for generating for multiplexing.

2. In a frequency multiplexer device for combining a plurality (n) of single signals of bandwidth (B), sampled with a sampling frequency (fa/n), said frequency multiplexer device comprising means for performing a Fourier transformation (FFT) of said single signals of said bandwidth (B) to obtain a plurality of complex input signals, each of said complex input signals having an imaginary portion and a real portion; and a plurality of means for generating an output signal for multiplexing from one of said imaginary portions and one of said real portions of said complex input signals, wherein each of said means for generating said output signal includes respective different chains of serially connected delay elements for delaying said one of said real portions and said one of said imaginary portions to form differently delayed imaginary signal portions and differently delayed real signal portions and means for combining and weighting pairs of said differently delayed imaginary signal portions and said differently delayed real signal portions to be weighted with an identical one of a plurality of different weighting factors to form respective weighted combined signals for each of said different weighting factors;

the improvement comprising removing one (D) of said delay elements from each of said different chains of delay elements, connecting said delay elements (D) removed from said chains to said means for performing a Fourier transformation (FFT) to delay said imaginary portions and said real portions of said complex input signals to form delayed imaginary portions and delayed real portions; means for weighting said imaginary portion and said real portion of said complex input signals and said delayed imaginary portions and said delayed real portions of said complex input signals with respective weighting factors ($C_1$, $C_3$, $C_5$) to form weighted resulting values and means for combining said weighted resulting values.

3. A frequency demultiplexer for frequency separation of a frequency multiplexer signal, composed of n single signals of bandwidth (B) sampled at a sampling frequency (fa), wherein said frequency demultiplexer device comprises a frequency multiplexer device comprising
means for performing a Fourier transformation (FFT) of said single signals of said bandwidth (B) to obtain a plurality of complex input signals, each of said complex input signals having an imaginary portion and a real portion; and a plurality of means for generating an output signal for multiplexing from said imaginary portion and said real portion of each of said complex input signals; wherein each of said means for generating said output signal includes respective different chains (111) of serially connected delay elements (110,D) for delaying said real portion and said imaginary portion to form differently delayed imaginary signal portions and differently delayed real signal portions; means for combining (+) and weighting pairs of said differently delayed imaginary signal portions and said differently delayed real signal portions to be weighted with an identical one of a plurality of different weighting factors ($\gamma h(5)$, $-\gamma h(1)$, $\gamma h(3)$) to form respective weighted combined signals for each of said different weighting factors, each of said means for combining and weighting comprising a series circuit branch including an adder (112) and a single multiplier (113) connected to said adder arranged to receive an addition result from said adder, said single multiplier comprising means for weighting said addition result of said adder with said one of said weighting factors; and means (114) for combining resultant signals from said multipliers to obtain said output signal of said means for generating for multiplexing;

wherein said frequency multiplexer has inputs, outputs, switching functions, branch points and signal flow directions and is subject to a transposition in which all of said signal flow directions are reversed, said inputs and said outputs are transposed, said adders are replaced by said branch points and said branch points are replaced by said adders, said means for performing said Fourier transformation is replaced by an inverse discrete Fourier transformation, said sampling frequency is replaced by a new value for said sampling frequency divided by a factor equal to a total number of said single signals (n) and all the switch functions for multiplexing are replaced by corresponding functions for demultiplexing.

4. The frequency demultiplexer as defined in claim 3, wherein said chains of delay elements multiplied by said factor and not interrupted by adding elements or intermediate outputs comprise an FIFO memory device or a RAM device.

* * * * *